United States Patent
Malagrino, Jr. et al.

[11] Patent Number: 6,052,890
[45] Date of Patent: Apr. 25, 2000

[54] METHOD OF MAKING A HEAD DISK ASSEMBLY USING A PROPAGATED LIGHT BEAM TO DETECT A CLEARANCE BETWEEN A DISK AND A HEAD

[75] Inventors: Gerald Daniel Malagrino, Jr.; John Bornholdt, both of Rochester, Minn.; Peter Keim, Saratoga, Calif.

[73] Assignee: Western Digital Corporation, Irvine, Calif.

[21] Appl. No.: 09/102,598

[22] Filed: Jun. 22, 1998

[51] Int. Cl.[7] .................................................. G11B 5/127
[52] U.S. Cl. ...................... 29/603.03; 360/104; 360/109; 369/112
[58] Field of Search ............................... 29/593, 603.03; 356/372, 375, 378; 360/103, 104, 105, 106, 109; 369/44.14, 44.23, 112

[56] References Cited

U.S. PATENT DOCUMENTS

| | | | |
|---|---|---|---|
| 4,537,509 | 8/1985 | Kronfeld ................................. | 356/399 |
| 4,597,668 | 7/1986 | Ono ........................................ | 356/372 |
| 5,043,835 | 8/1991 | Watanabe et al. ..................... | 360/109 |
| 5,099,373 | 3/1992 | Shibata et al. ......................... | 360/104 |
| 5,148,415 | 9/1992 | Takeuchi ................................ | 369/13 |
| 5,150,512 | 9/1992 | Hatchett et al. . | |
| 5,280,340 | 1/1994 | Lacey .................................... | 356/357 |
| 5,392,173 | 2/1995 | Kinoshita et al. ..................... | 360/75 |
| 5,677,805 | 10/1997 | Parker et al. ......................... | 360/75 |
| 5,712,463 | 1/1998 | Singh et al. . | |
| 5,731,934 | 3/1998 | Brooks et al. ......................... | 360/106 |
| 5,751,427 | 5/1998 | De Groot .............................. | 356/358 |
| 5,789,756 | 8/1998 | Guzik ................................ | 250/559.29 |

*Primary Examiner*—David P. Bryant
*Assistant Examiner*—Essama Omgba
*Attorney, Agent, or Firm*—Milad G. Shara

[57] ABSTRACT

A method of making a head disk assembly using a fixture is disclosed. The head disk assembly includes a base having an interior-horizontal surface and a side wall extending in a direction substantially perpendicular to the horizontal surface, a disk for coupling to the base, and a head for coupling to the base. The disk includes a head facing surface and an outer diameter and the head includes a disk facing surface. The fixture includes a light source for propagating a light beam towards the side wall, a light reflecting structure for receiving the light beam and outputting a reflected light beam, and a control structure for controlling a vertical movement of the light reflecting structure, the light reflecting structure includes a reflecting mirror surface defining an angle with respect to the horizontal surface. The method includes the steps of coupling the disk to the base, coupling the head to the base, positioning the head towards the disk such that the head is positioned adjacent to the outer diameter of the disk and positioned between the outer diameter and the side wall. The method further includes controllably moving the light reflecting structure vertically towards the horizontal surface such that the reflecting mirror surface is positioned proximate to the disk and the head and is positioned between the side wall and the head, propagating the light beam from the light source to the light reflecting structure such that the reflecting mirror surface reflects the light beam incident upon its surface to output the reflected light beam such that the reflected light beam defines a signal that depends on an amount of light passing between the head facing surface and the disk facing surface, detecting a clearance between the head facing surface and the disk facing surface based on the signal, and merging the head with the disk.

7 Claims, 5 Drawing Sheets

METHOD OF MAKING A HEAD DISK ASSEMBLY USING A PROPAGATED LIGHT BEAM TO DETECT A CLEARANCE BETWEEN A DISK AND A HEAD

BACKGROUND OF THE INVENTION

1. Field of the Invention

This invention relates to disk drives. In particular, this invention relates to a method of making a head disk assembly of a hard disk drive by using a fixture for a head-disk merge operation.

2. Description of the Related Art and Related Information

A huge market exists for hard disk drives for mass-market host computer systems such as servers, desktop computers, and laptop computers. To be competitive in this market, a hard disk drive must be relatively inexpensive, and must accordingly embody a design that is adapted for low-cost mass production. In addition, it must provide substantial capacity, rapid access to data, and reliable performance. Numerous manufacturers compete in this huge market and collectively conduct substantial research and development, at great annual cost, to design and develop innovative hard disk drives to meet increasingly demanding customer requirements.

Each of numerous contemporary mass-market hard disk drive models provides relatively large capacity, often in excess of 1 gigabyte per drive. Nevertheless, there exists substantial competitive pressure to develop mass-market hard disk drives that have even higher capacities and that provide rapid access. Another requirement to be competitive in this market is that the hard disk drive must conform to a selected standard exterior size and shape often referred to as a "form factor." Generally, capacity is desirably increased without increasing the form factor or the form factor is reduced without decreasing capacity.

Satisfying these competing constraints of low-cost, small size, high capacity, and rapid access requires innovation in each of numerous components and methods of assembly including methods of assembly of various components into certain subassemblies. Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement. The printed circuit board assembly includes circuitry for processing signals and controlling operations.

Actuator arrangements can be characterized as either linear or rotary; substantially every contemporary cost-competitive small form factor drive employs a rotary actuator arrangement.

The rotary actuator arrangement is a collection of elements of the head disk assembly; the collection typically includes certain prefabricated subassemblies and certain components that are incorporated into the head disk assembly. The prefabricated assemblies include a pivot bearing cartridge and, in some cases, a prefabricated head stack assembly which may include the pivot bearing cartridge. Other components of the rotary actuator arrangement are permanent magnets and an arrangement for supporting the magnets to produce a magnetic field for a voice coil motor. The prefabricated head stack assembly includes a coil forming another part of the voice coil motor. The prefabricated head stack assembly also includes an actuator body having a bore through it, and a plurality of arms projecting parallel to each other and perpendicular to the axis of the bore. The prefabricated head stack assembly also includes head gimbal assemblies that are supported by the arms. Each head gimbal assembly includes a load beam and a head supported by the load beam.

In the course of making a head disk assembly, the heads are merged with the disks during an operation known as a "head-disk merge operation." With reference to Related Art FIG. 1, a head disk assembly 100 is shown which includes a base 102, a spindle motor 104, and a plurality of disks 106 mounted on the spindle motor. A corresponding set of heads 108 is positioned proximate to an outside diameter of the disks. A merge comb (not shown) separates the heads as shown in FIG. 1 until a sufficient clearance is detected between each head and each corresponding disk. When sufficient clearance is detected, the heads are then merged with the disks and the merge comb is removed.

In order to detect the clearance, a prism 110 is positioned proximate the heads such that a reflecting mirror surface 107 is positioned over a side wall 105 of base 102. Side wall 105 is relatively short since the head disk assembly includes a stack of relatively few disks (three are shown) which allows a relatively large prism 110 to be lowered partly into an interior of base 102 such that mirror surface 107 is positioned over side wall 105. Such a relatively large prism and its position relative to base 102 allowed the clearances to be detected simultaneously. A light beam 112 originating from a light source beyond another side wall 114 and propagated towards side wall 105 was used to detect the clearance.

In order to increase capacity of a hard disk drive, the number of disks is typically increased. When the number of disks increases, the height of the side walls correspondingly increases which prevents the use of relatively large prism 110 to detect clearance. In other words, the thickness of the prism prevents the positioning of mirror surface 107 proximate to the bottom disk and corresponding heads. Holes may be created in such a base to detect clearance by visual inspection or via a suitable lens/camera system. However, such holes need to be sealed after a head-disk merge operation is completed which increases the costs of making a head disk assembly and which may introduce contaminants into its interior.

SUMMARY OF THE INVENTION

This invention can be regarded as a method of making a head disk assembly using a fixture. The head disk assembly includes a base having an interior-horizontal surface and a side wall extending in a direction substantially perpendicular to the horizontal surface, a disk for coupling to the base, and a head for coupling to the base. The disk includes a head facing surface and an outer diameter and the head includes a disk facing surface. The fixture includes light source means for propagating a light beam towards the side wall, light reflecting means for receiving the light beam and outputting a reflected light beam, and control means for controlling a vertical movement of the light reflecting means; the light reflecting means includes a first reflecting mirror surface defining an angle with respect to the horizontal surface.

The method includes the steps of coupling the disk to the base, coupling the head to the base, positioning the head towards the disk such that the head is positioned adjacent to the outer diameter of the disk and positioned between the outer diameter and the side wall. The method further includes controllably moving the light reflecting means vertically towards the horizontal surface such that the first reflecting mirror surface is positioned proximate to the disk and the head and is positioned between the side wall and the head, propagating the light beam from the light source means to the light reflecting means such that the first reflecting mirror surface reflects the light beam incident upon its surface to output the reflected light beam such that the reflected light beam defines a signal that depends on an amount of light passing between the head facing surface and the disk facing surface, detecting a clearance between the head facing surface and the disk facing surface based on the signal, and merging the head with the disk.

DETAILED DESCRIPTION OF A PREFERRED EMBODIMENT

Figure 2:
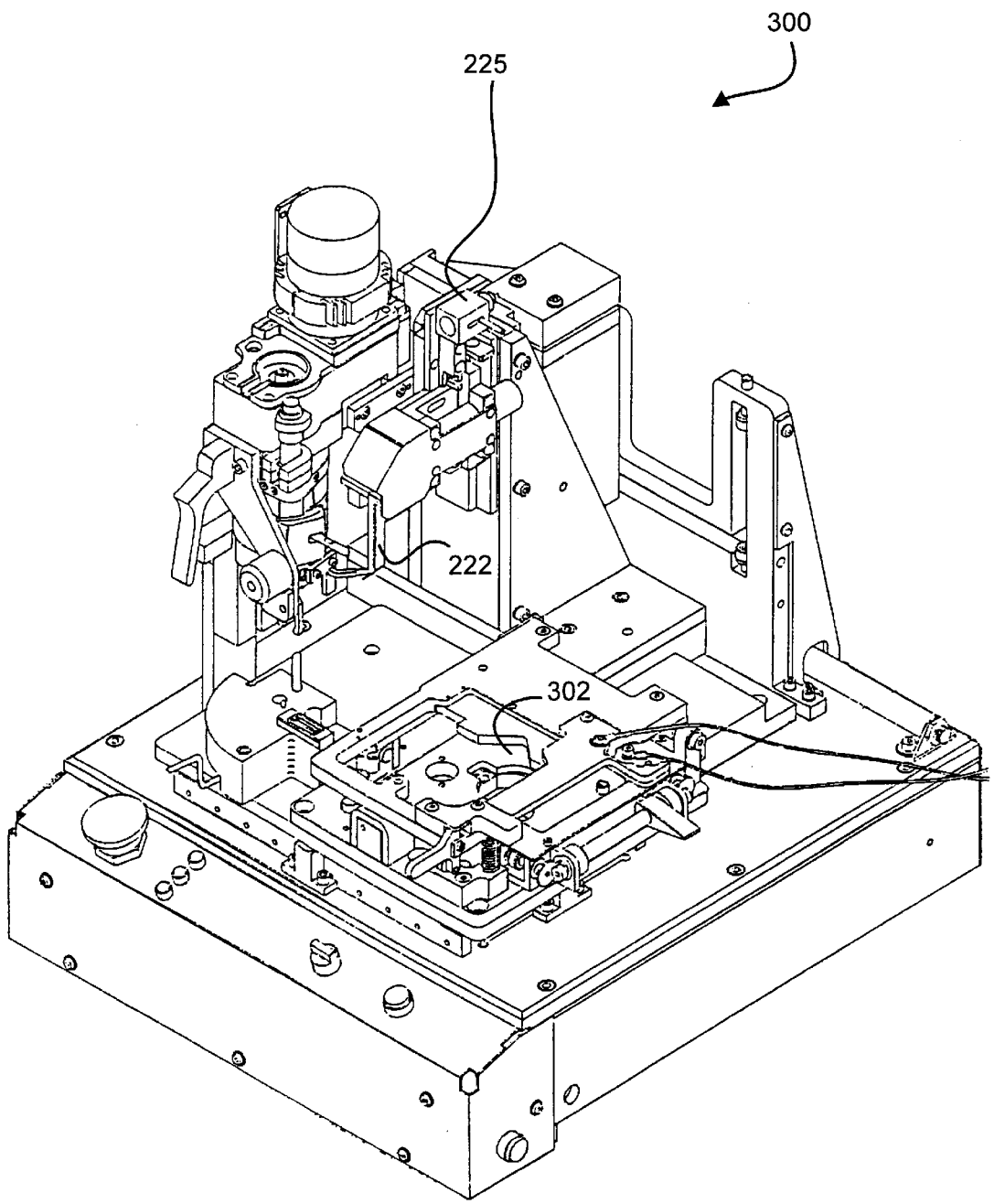
FIG. 2 is a fixture used for a head-disk merge operation.

With reference to FIG. 2, a fixture 300 includes a nest 302, a light reflecting means such as a prism 222, and a stop block 225 to be described below. A head disk assembly with its cover removed is mounted in nest 302 to start the head-disk merge operation.

Figure 3A:
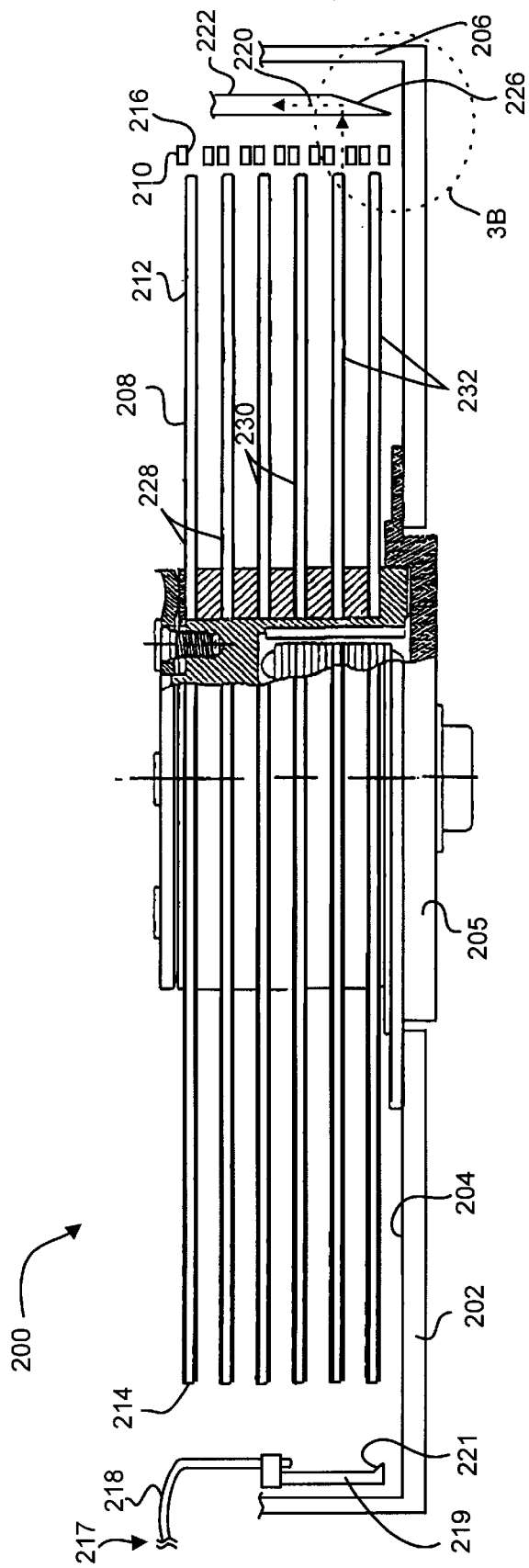
FIG. 3A is a cross sectional view of a portion of a head disk assembly and components of a fixture used during a head-disk merge operation according to this invention; the components are a fiber optic light source and a prism.
Figure 3B:
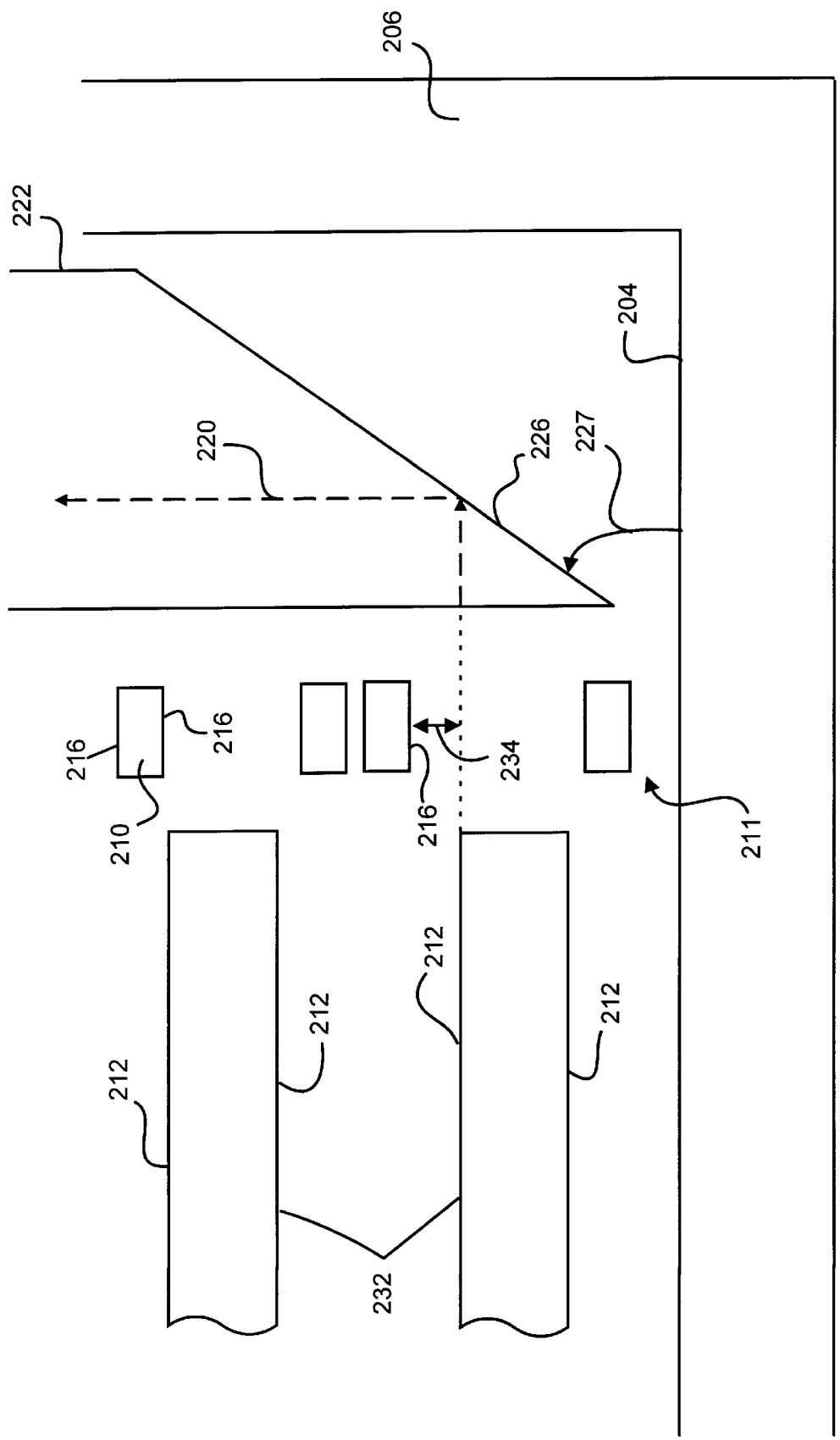
FIG. 3B is an enlarged cross sectional view of a portion of FIG. 3A.
Figure 4:
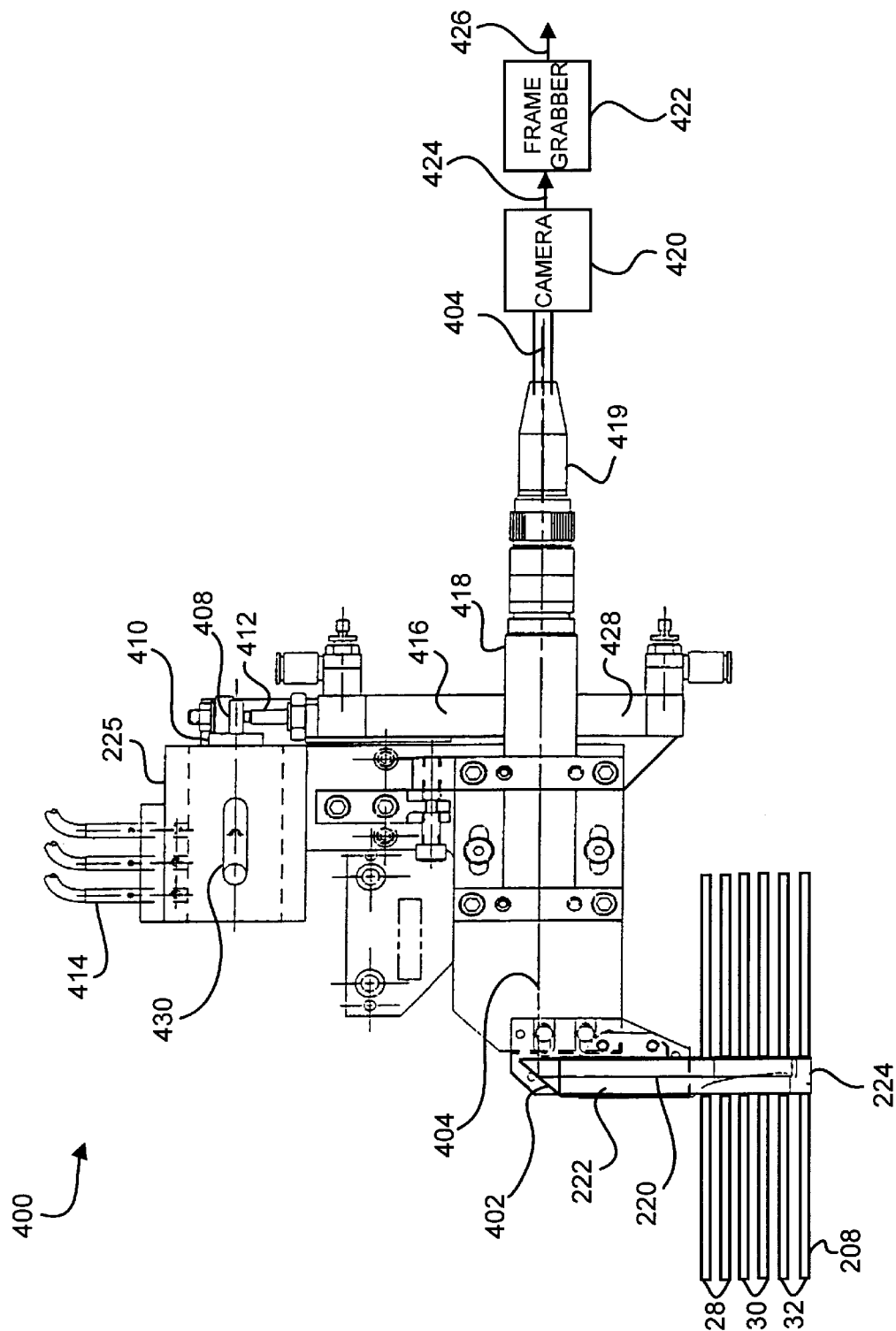
FIG. 4 is a side view of a portion of FIG. 2 and a stack of disks.

With reference to FIGS. 3A–3B and 4, a preferred embodiment of this invention is shown. In particular, with reference to FIGS. 3A and 3B, a head disk assembly ("HDA") 200 includes a base 202 having a side wall 206 and an interior horizontal surface 204, a spindle motor 205, a plurality of disks 208 coupled to base 202 via spindle motor 205, and a plurality of heads 210 coupled to base 202. Side wall 206 extends in a direction substantially perpendicular to interior horizontal surface 204.

Preferably, six disks 208 and twelve heads 210 are used. Each disk includes an outer diameter 214 and a head facing surface 212. The stack of disks shown in FIG. 3A includes a top pair 228, a middle pair 230, and a bottom pair 232 of disks. Each head includes a disk facing surface 216, and the heads shown in FIG. 3A include a top set comprising the top four heads, a middle set comprising the middle four heads, and a bottom set comprising the bottom four heads. As shown, after head disk assembly 200 is mounted in the nest, heads 210 are positioned proximate to outer diameter 214 of the disks to start the head-disk merge operation.

Figure 1:
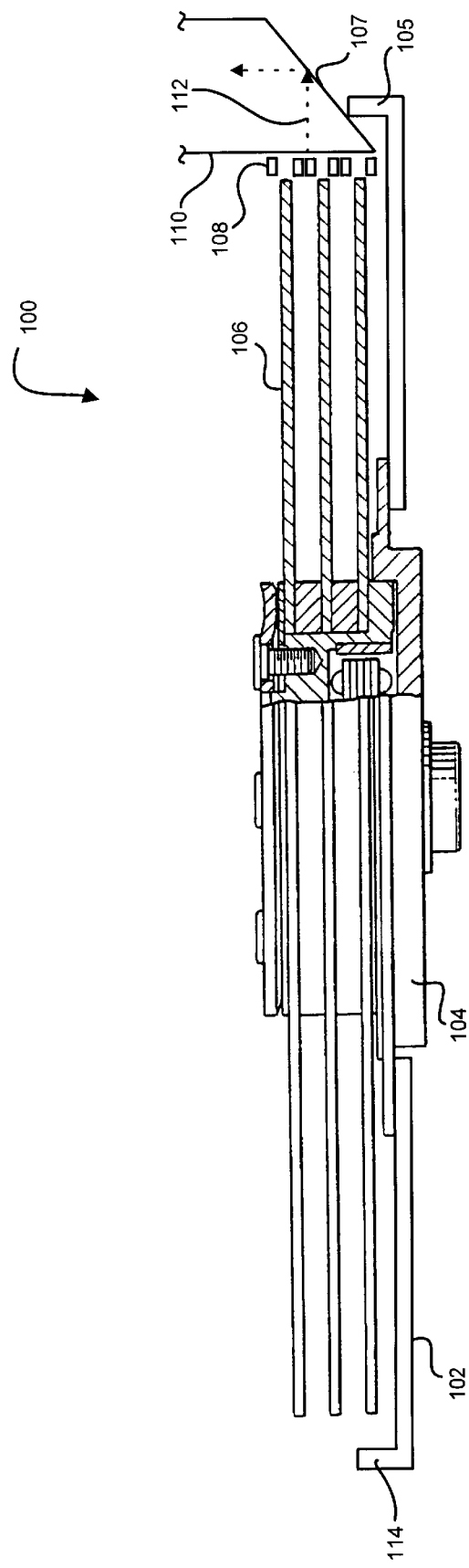
FIG. 1 is a cross sectional view of a portion of a head disk assembly and a prism used during a head-disk merge operation according to the Related Art.

A light source means such as a fiber optic light source, generally indicated by 217, is used to propagate a light beam, schematically represented by 220, towards side wall 206. Fiber optic light source 217 includes a light source (not shown) outside of head disk assembly 200 for generating ("outputting") the light beam, a light guide 218 connected to the light source for providing the light beam inside of the HDA, and a light guide holder 219 having a sloped surface 221 for propagating the light beam towards the side wall. Suitably, the light source includes a light bulb of approximately 150 watts for outputting the light beam. As shown in FIG. 3A, a light reflecting means such as an elongated prism 222 receives light beam 220 and outputs a reflected light beam 404 (FIG. 4). Prism 222 includes a first reflecting mirror surface 226 for receiving the propagated light beam and reflecting it vertically towards a second reflecting mirror surface 402 (FIG. 4) which outputs reflected light beam 404. The first and second reflecting mirror surfaces are vertically spaced-apart and each mirror surface defines an angle with respect to interior horizontal surface 204. In a preferred embodiment, the first mirror surface 226 defines an angle 227 (FIG. 3B) of 45 degrees. Second mirror surface 402 also defines an angle which is 45 degrees. Prism 222 is relatively thin compared to the prism shown in Related Art FIG. 1 such that in the lowermost position ("lower position") shown in FIG. 3A, first mirror surface 226 is between side wall 206 and heads 210.

With reference to FIG. 3B, bottom set of heads 210 generally indicated by 211 is positioned proximate to bottom pair of disks 232. A clearance 234 between disk facing surface 216 and head facing surface 212 allows the propagated light beam 220 to pass between the surfaces such that clearance 234 defines an amount of light that passes between the head facing surface and the disk facing surface.

With reference to FIG. 4, a portion, generally indicated by 400, of fixture 300 is shown. Portion 400 is used to perform the head-disk merge operation for an HDA mounted in a nest. In the figure, only the disks are shown. Prior to inserting the HDA into the nest, components of the HDA such as disks and a head stack assembly (and hence, the heads) are coupled to the base of the HDA. After the HDA is inserted into the nest, the heads are positioned towards the disks such that the heads are positioned adjacent to the outer diameter of the disks and positioned between the outer diameter and the side wall (FIG. 3A). A control means such as a vertical cylinder 416 controls the vertical movement of prism 222 towards or away from interior horizontal surface 204 (FIG. 3A) of the base.

As shown, prism 222, encased in a prism support 224, is positioned at its bottom position such that first mirror surface 226 is positioned proximate to bottom pair of disks 232 and bottom set of heads and between the side wall and the heads (FIG. 3B). While in this position, fiber optic light source 217 propagates light beam 220 towards the side wall such that first mirror surface 226 reflects the light beam incident upon its surface to output reflected light beam 404. Reflected light beam 404 is transmitted via a camera tube 418 and camera cable 419 to a camera 420. Camera tube 418 includes in series an aperture and a lens (not shown) through which the light beam passes. Camera 420 outputs a signal 424 that depends on an amount of light passing between the head facing surface and the disk facing surface of the bottom pair of heads and the bottom set of heads. Signal 424 is inputted to a microprocessor ("frame grabber") 422 which detects a clearance between the head facing surfaces and the corresponding disk facing surfaces based on signal 424. Frame grabber 422 outputs a signal 426 to a monitor (not shown) which displays the picture taken by camera 420 so that an operator may make adjustments to the relative spacing between the heads and the disks as needed to provide sufficient clearance.

Continuing with FIG. 4, after a sufficient clearance is detected between the bottom pair of disks and the bottom set of heads by frame grabber 422, prism 222 is moved vertically upwards to a middle position to detect clearance between middle pair of disks 230 and the middle set of heads. Finally, after a sufficient clearance is detected between the middle pair of disks and the middle set of heads, prism 222 is again moved vertically upwards to a top position to detect clearance between top pair of disks 228 and the top set of heads. Once the clearances are detected, the heads are merged with the disks and a merge comb is removed.

Portion 400 includes a stop block 225 having a bottom cylinder 408, a middle cylinder 410, and a top cylinder (not shown) which correspond to the above described bottom position, middle position, and top position of prism 222. In other words, when bottom cylinder 408 abuts a hard stop 412 as shown in FIG. 4, prism 222 is positioned in its bottom position. After moving stop block 225 vertically upwards, a lever 430 is used to radially extend middle cylinder 410 such that it abuts hard stop 412 which corresponds to the middle position of the prism. Position sensors 414 sense the position of stop block 225. Fixed cylinder 428 remains stationary while the remaining structure of portion 400 moves up and down via vertical cylinder 416.

In a preferred embodiment, the clearances are detected by positioning prism 222 initially in the bottom position, detecting the clearances, and then stepping the prism vertically upward to its middle and top positions. In an alternative embodiment, the clearances may be detected by positioning prism 222 initially in the top position and then stepping the prism vertically downward to its middle and bottom positions. In yet another embodiment, prism 222 may be initially positioned in its middle position, and then stepped vertically upward to the top position and then vertically downward to the bottom position or vice versa. While in the preferred embodiment, the clearances were detected simultaneously for two disks and four corresponding heads, other combinations of heads and disks are possible. For example, the clearances may be detected for one disk and two corresponding heads or three disks and six corresponding heads. Also, instead of using a prism having the mirror surfaces, two separate mirrors may be used, each mirror being sufficiently supported. In a preferred embodiment, the prism may be made from solid glass.

Suitably, the clearances are detected by frame grabber 422 as follows. When prism 222 is in its bottom position as shown in FIG. 5, the frame grabber takes a "frame" of the bottom pair of disks and the bottom set of heads. First, the disks are detected by scanning for a predetermined amount of black pixels which correspond to the disks in a predetermined position in the frame. The amount of black pixels are compared with a first threshold value which is suitably equal to one pixel. If the amount of black pixels is greater than or equal to the first threshold value, then a determination is made by the frame grabber that the disks have been detected. Next, the heads are detected by stepping up or down a predetermined distance from a respective disk. Once the heads are detected, the amount of white pixels between a head and disk is compared with a second threshold value which is suitably one pixel. If the amount of white pixels is equal to or greater than one pixel, then the frame grabber determines that a sufficient clearance has been detected.

We claim:

1. A method of making a head disk assembly using a fixture, the head disk assembly including a base having an interior-horizontal surface and a side wall extending in a direction substantially perpendicular to the horizontal surface, a plurality of disks for coupling to the base, and a head stack assembly for coupling to the base, the head stack assembly including a plurality of heads suspended to allow them to be separated along a vertical line during a head-merge operation; each of the disks including a head facing surface and each of the heads including a disk facing surface, the fixture including light source means for propagating a light beam towards the side wall, light reflecting means for receiving the light beam and outputting a reflected light beam, control means for controlling a sequence of vertical movements of the light reflecting means to a set of vertical positions within a vertically-extending space between the disks and the side wall, the light reflecting means including a first reflecting mirror surface defining an angle with respect to the horizontal surface, the method comprising the steps of:

coupling the disks to the base such that the disks are surrounded by the side wall;

coupling the head stack assembly to the base such that the heads are positioned in the vertically-extending space;

separating the heads to provide, between each adjacent head-facing surface and disk-facing surface, a respective one of a set of clearances;

controllably moving the light reflecting means vertically to each of the set of vertical positions such that the first reflecting mirror surface is successively positioned proximate to the respective one of the set of clearances and at each of the vertical positions is entirely positioned in the vertically-extending space between the disks and the side wall;

propagating the light beam from the light source means to the light reflecting means such that the first reflecting mirror surface reflects the light beam incident upon its surface to output the reflected light beam such that the reflected light beam defines a signal that depends on an amount of light passing between the head facing surface and the disk facing surface;

repeatedly detecting that the clearances between the head facing surfaces and the disk facing surfaces based on the signal are each sufficient for performing the head-merge operation; and merging the heads with the disks.

2. The method of claim 1 wherein the plurality of disks comprises six disks defining a top pair, a middle pair, and a bottom pair of disks, and the plurality of heads comprises twelve heads defining a top set, a middle set, and a bottom set of heads, each set including four heads.

3. The method of claim 2 further comprising the steps of:

a) positioning the first reflecting mirror surface proximate to the bottom pair of disks and the bottom set of heads; and b) detecting a clearance between each head facing surface of the bottom pair of disks and each disk facing surface of the bottom set of heads based on the signal.

4. The method of claim 3 further comprising the steps of: after step b):

c) positioning the first reflecting mirror surface proximate to the middle pair of disks and the middle set of heads; and d) detecting a clearance between each head facing surface of the middle pair of disks and each disk facing surface of the middle set of heads based on the signal.

5. The method of claim 4 further comprising the steps of: after step d):

e) positioning the first reflecting mirror surface proximate to the top pair of disks and the top set of heads; and f) detecting a clearance between each head facing surface of the top pair of disks and each disk facing surface of the top set of heads based on the signal.

6. The method of claim 2 further comprising the steps of:

a) positioning the first reflecting mirror surface proximate to the top pair of disks and the top set of heads; and b) detecting a clearance between each head facing surface of the top pair of disks and each disk facing surface of the top set of heads based on the signal.

7. The method of claim 3 further comprising the steps of a) positioning the first reflecting mirror surface proximate to the middle pair of disks and the middle set of heads; and b) detecting a clearance between each head facing surface of the middle pair of disks and each disk facing surface of the middle set of heads based on the signal.

* * * * *